UNITED STATES PATENT OFFICE.

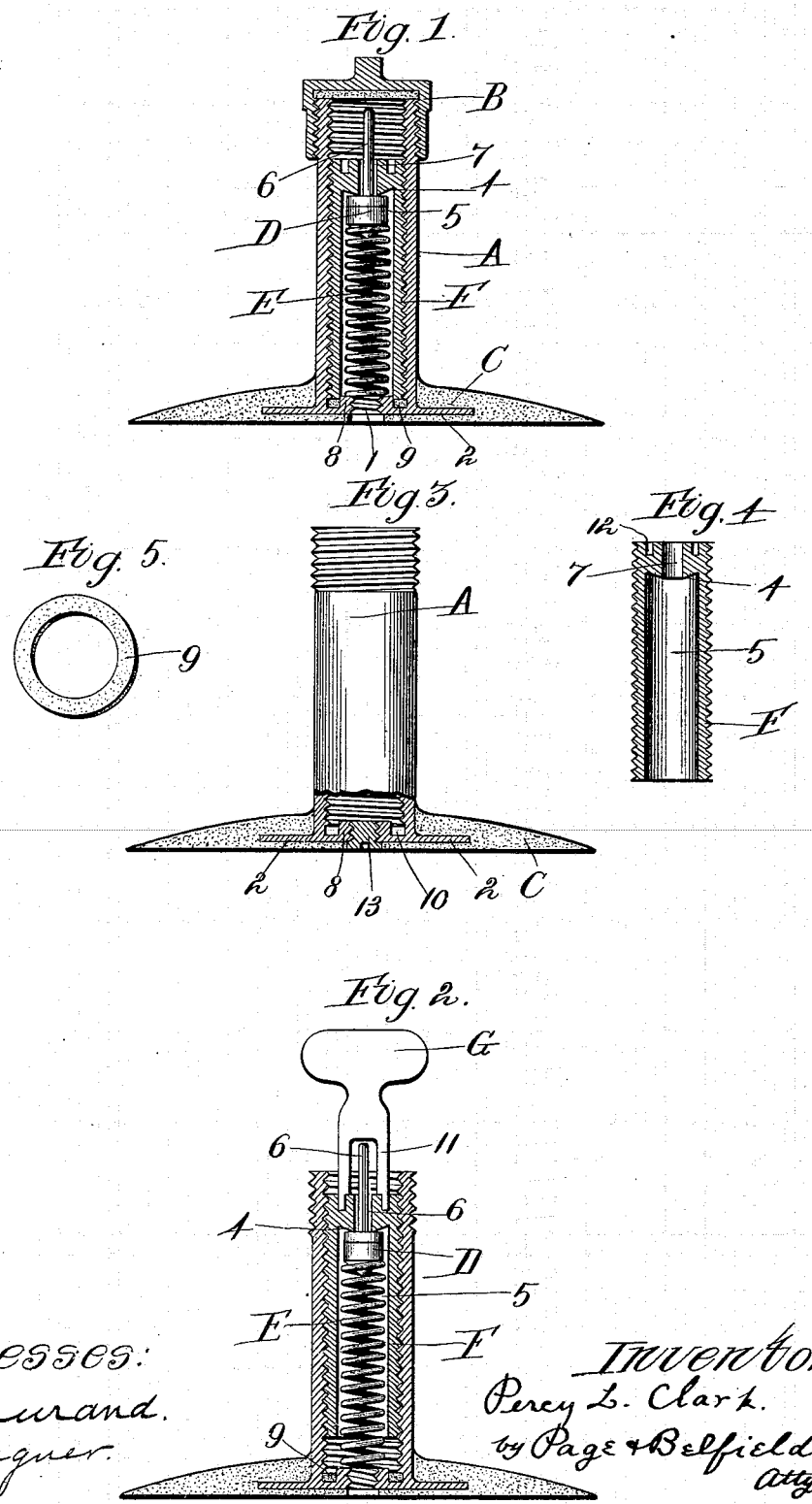

PERCY L. CLARK, OF CHICAGO, ILLINOIS, ASSIGNOR TO THE MORGAN & WRIGHT, OF SAME PLACE.

VALVE DEVICE FOR PNEUMATIC TIRES.

SPECIFICATION forming part of Letters Patent No. 612,380, dated October 11, 1898.

Application filed April 3, 1897. Serial No. 630,666. (No model.)

*To all whom it may concern:*

Be it known that I, PERCY L. CLARK, a citizen of the United States, residing at Chicago, in the county of Cook and State of Illinois, have invented a certain new and useful Improvement in Valve Devices for Pneumatic Tires, of which the following is a specification.

My invention relates to a construction of pneumatic-tire-inflating valve device involving an inwardly-opening check-valve which is kept properly seated by means of a suitable spring against a valve-seat arranged for bodily removal from the device, so as to permit the removal and replacement of the check-valve or check-valve spring, or both, without necessitating the detachment of the device from the tire.

Prominent objects of my invention are to provide such a removable valve-seat for valve devices in a simple, inexpensive, and economical manner, to allow the separate inspection of either the check-valve or its valve-spring after the valve-seat has been removed from the device, to arrange for the removal and replacement of the check-valve alone without necessitating a preliminary removal of either the check-valve spring or any parts of the device other than the valve-seat, to insure against loss of the check-valve spring, to reduce to a minimum the number of parts employed in the construction of the device, to prevent leakage of air from the tire, and to provide certain novel features tending to increase the efficiency of such valve devices.

To the attainment of the foregoing and other useful ends my invention consists in matters hereinafter set forth.

In the accompanying drawings, Figure 1 is a view illustrating in vertical section a valve device embodying my invention. Fig. 2 is a similar vertical section showing the upper cap or cover removed, and a removable sleeve provided with the removable valve-seat, partly removed. Fig. 3 is a view, partly in elevation and partly in section, of the device with both the cover and said removable sleeve removed. Fig. 4 is a vertical section of said removable sleeve. Fig. 5 is a perspective view of a packing-washer used in connection with said removable sleeve.

In the construction of valve device illustrated, A represents a tubular cylindrical shell or casing having an opening 1 at its lower end for communication with the interior of the tire, and B represents a suitable interiorly-threaded cap or cover fitted upon the upper screw-threaded end of the casing A.

The casing A could be attached to the pneumatic tire in any suitable manner; but as a preferred arrangement a flat rubber base C, suitable for attachment to the interior of the tire, is formed about an outwardly-projecting flange 2, with which the lower end of said casing A is provided.

The casing A incloses a suitable check-valve D, which is seated against a removable valve-seat 4, so as to prevent the escape of air outward from the tire, but which is capable of inward movement in its valve-chamber 5, so as to permit the inflation of the tire. The check-valve D is desirably provided with a valve-stem 6, which extends upwardly through the contracted opening or passageway 7, formed in the valve-seat, whereby the check-valve can be forced away from its valve-seat, so as to permit the deflation of the tire by a downward pressure on the valve-stem. The casing A also incloses a coil-spring E, which is adapted automatically to insure the proper seating of the check-valve D and is applied to the latter at a point below its valve-seat—that is to say, at a point between the valve-seat and the tire. By such arrangement the check-valve alone can be removed for inspection or can be removed and replaced by a simple removal of the check-valve seat— that is to say, without the preliminary removal of either the check-valve spring or of any part of the device other than the valve-seat. By such arrangement also the device is simplified by dispensing with the necessity of employing an abutment for the spring above the valve-seat—as, for instance, a nut or the like fitted upon the valve-stem—and also the liability of losing the spring as a result of the displacement or loss of such upper abutment is avoided.

The check-valve spring E is desirably confined within the check-valve chamber 5, the latter being suitably extended in length to accommodate the same, whereby when the check-valve D is removed the spring E can also be removed and either one alone can be inspected or replaced without the removal of other parts. Said check-valve spring E has its upper end conveniently applied to the lower conical face of the check-valve, while its lower end is seated upon an annular seat 8, conveniently formed at the lower end of the casing A.

The removable valve-seat 4 and chamber 5 are conveniently provided with a removable sleeve F, having the valve-seat 4 formed at its upper end and provided with the contracted opening 7, and also having a suitable bore below the valve-seat for the accommodation of the check-valve D and the spring E.

The sleeve F could be arranged for insertion within and removal from the casing A in any suitable manner; but as a preferred arrangement the casing A is interiorly screw-threaded and the sleeve F is correspondingly threaded exteriorly, whereby the latter can be screwed into and out of the former.

The lower end of the sleeve F is seated upon an annular packing-washer 9, which latter is conveniently confined within an annular seating-chamber 10, formed in the casing A at the base of the screw-threads, whereby when the sleeve F is screwed tightly down into the casing A the packing-washer 9 expands radially against the outer wall of its seating-chamber, and thereby prevents the leakage of air upward between the screw-threads of the sleeve and casing.

The sleeve F can be screwed into and out of the casing A by a screw-driver or other like tool, for which purpose said sleeve could be provided with a slot or the like. As a preferred arrangement, however, a tool G, Fig. 2, is employed for such purpose, said tool G being constructed with a couple of fingers 11, which are adapted for insertion within suitable apertures 12, with which the upper end of the sleeve F is provided.

As a means of preventing the filling of the opening 1 at the lower end of the casing A with rubber during the formation of the rubber base C on the end of said casing, I have shown said opening 1 interiorly screw-threaded and provided with a screw-threaded plug 13, Fig. 2, which latter can be temporarily inserted therein during such formation of the base C and can be subsequently withdrawn before the device is put in use.

What I claim is—

A pneumatic-tire valve comprising an interiorly-threaded tubular shell or casing adapted for attachment to the tire, and having the outer portion of said interiorly-threaded surface exposed for the purpose of making connection with an air-pump; an exteriorly-threaded tubular shell F fitted removably and entirely within the said interiorly-threaded shell or casing, and having its outer end formed to provide a valve-seat 4 for an inwardly-opening valve, and its inner end adapted to engage a packing-ring 9; said packing-ring being seated or confined within an annular groove or recess 10 at the base of the said interiorly-threaded shell; and a spring arranged within said exteriorly-threaded shell and adapted to close the said valve, substantially as described.

PERCY L. CLARK.

Witnesses:
A. F. DURAND,
R. M. WAGNER.